July 13, 1937. R. E. LEWIS 2,086,563
CHANGE SPEED TRANSMISSION
Filed Dec. 22, 1934 4 Sheets-Sheet 3
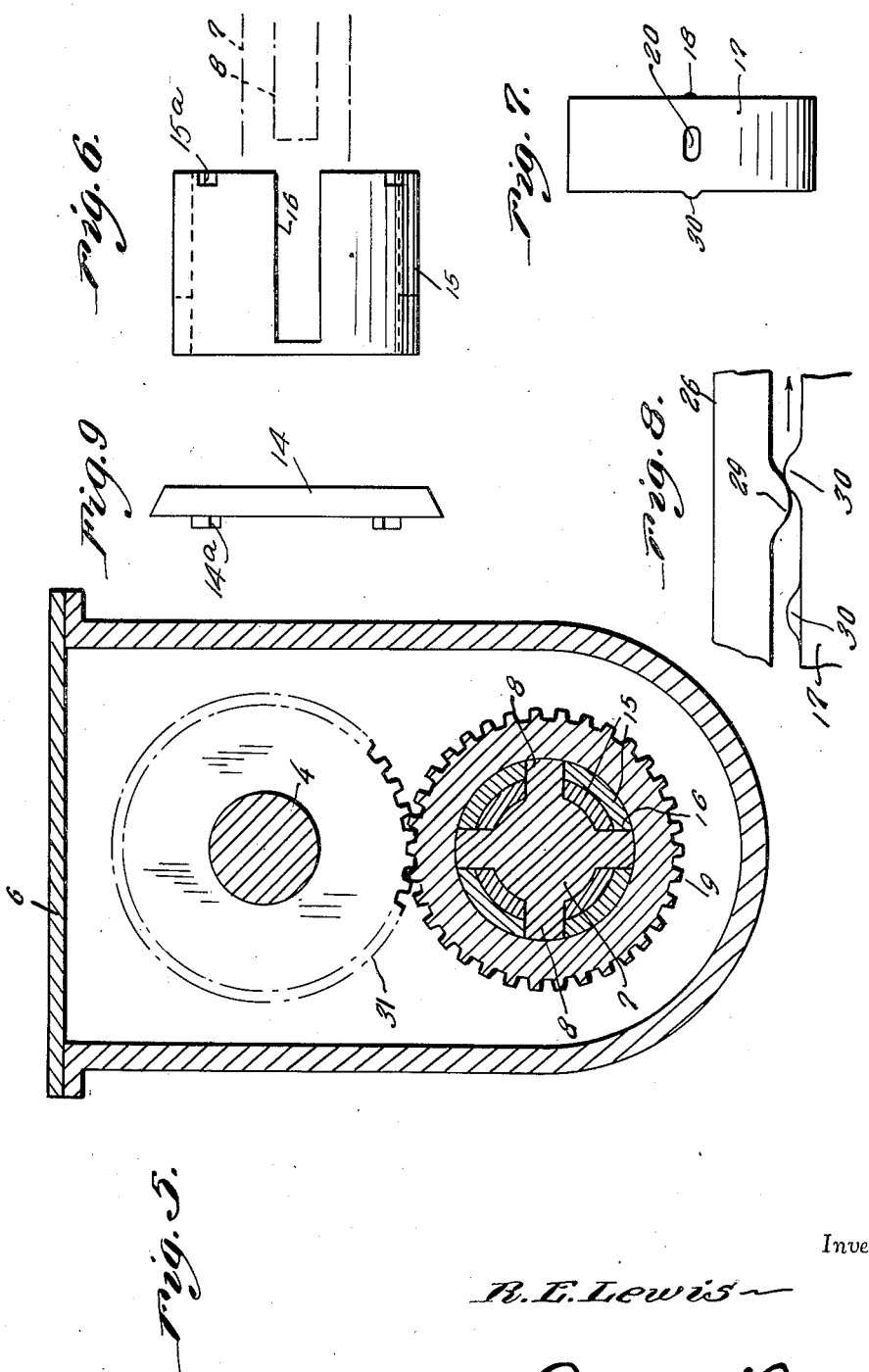
Inventor
R. E. Lewis
By Clarence A. O'Brien
Attorney July 13, 1937.  R. E. LEWIS  2,086,563
CHANGE SPEED TRANSMISSION
Filed Dec. 22, 1934   4 Sheets-Sheet 4

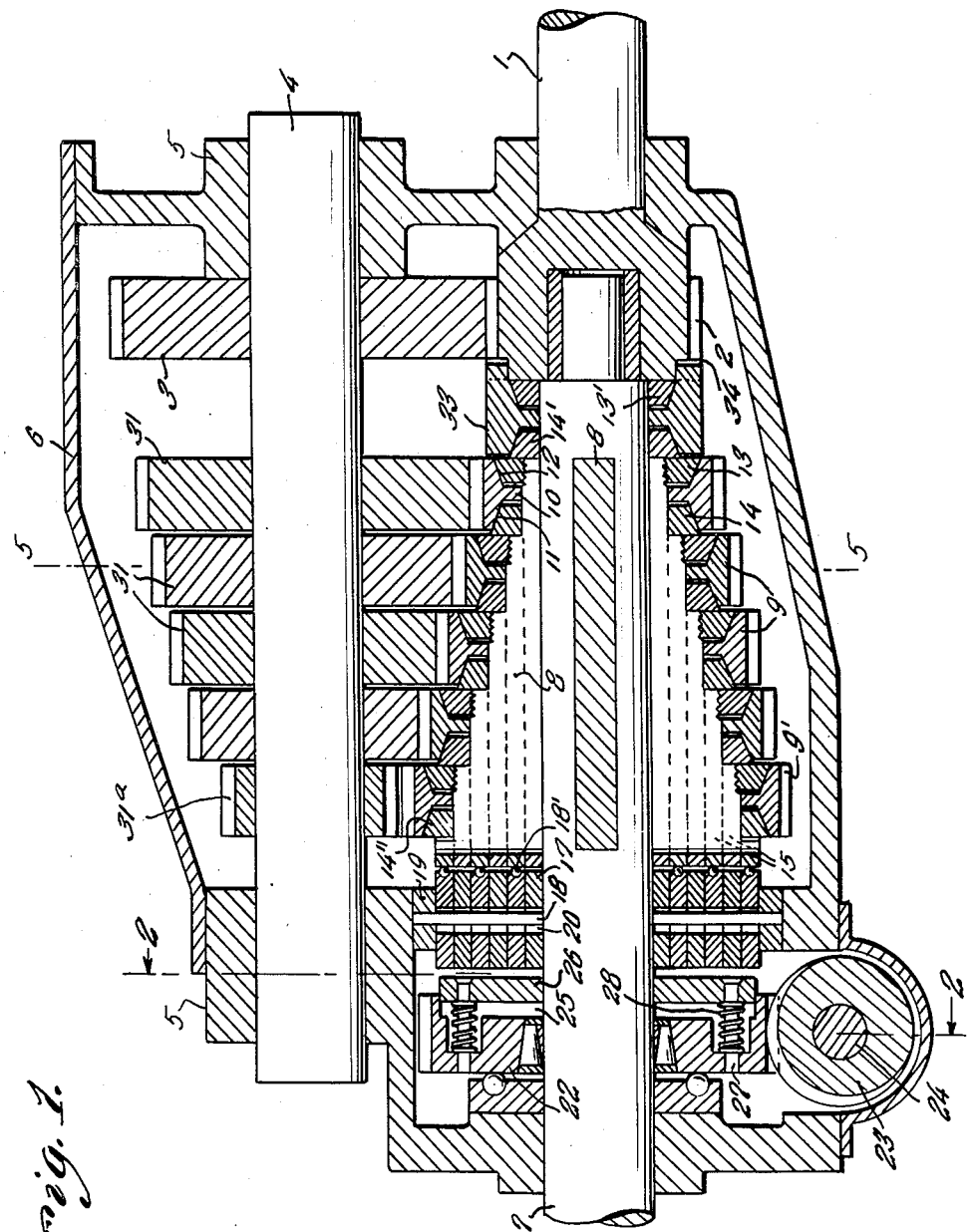

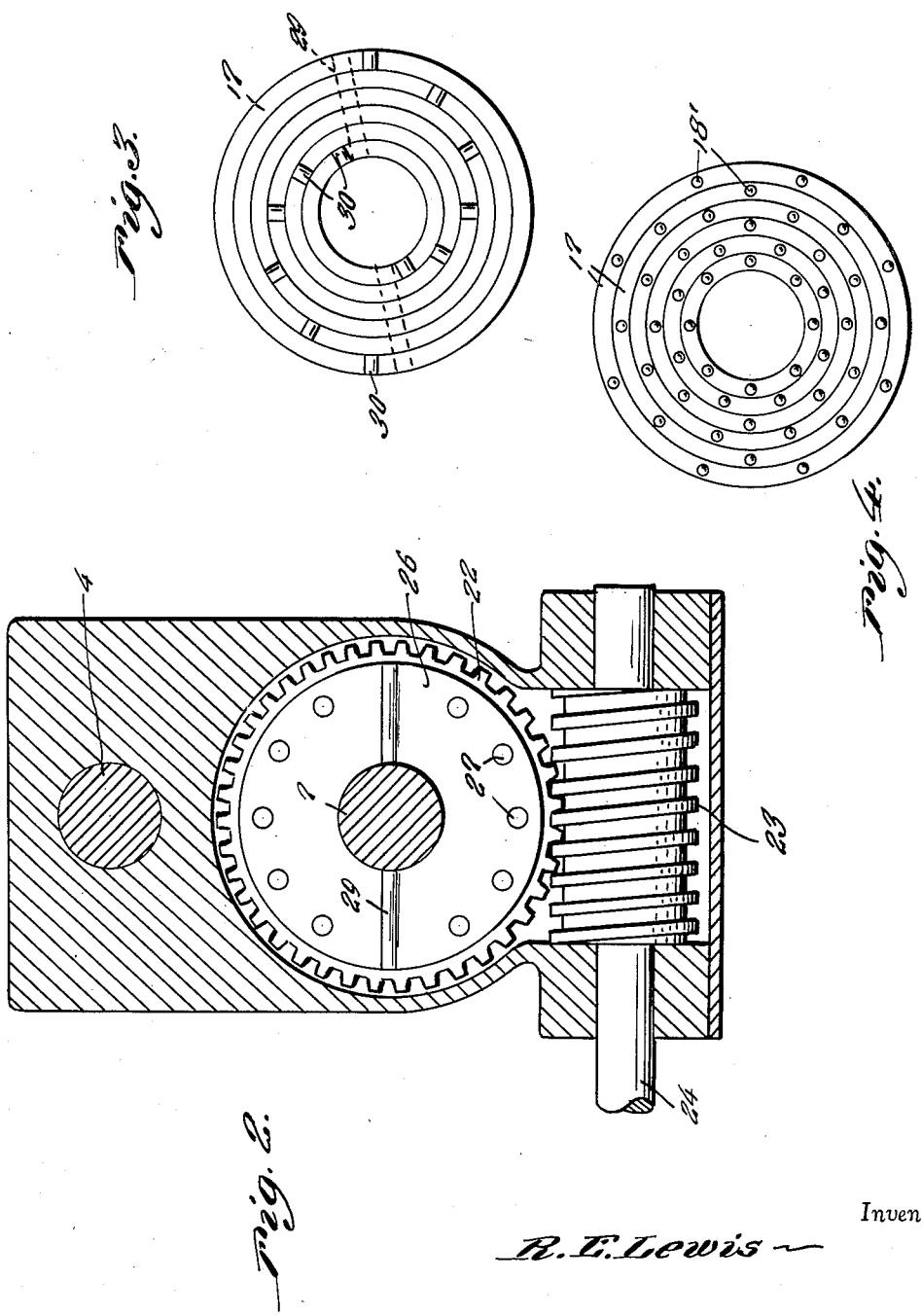

Inventor

R. E. Lewis

By Clarence A. O'Brien and
Hyman Berman
Attorneys

Patented July 13, 1937

2,086,563

UNITED STATES PATENT OFFICE 2,086,563

CHANGE SPEED TRANSMISSION

Robert E. Lewis, Hopewell, Va., assignor of eighteen and one-ninth per cent to Ollie Reese, thirteen and four-ninths per cent to Aaron F. Walker, thirteen and four-ninths per cent to Frank A. Walker, and thirteen and four-ninths per cent to Gould C. McIntyre, all of Hopewell, Va.

Application December 22, 1934, Serial No. 758,811

7 Claims. (Cl. 74—363)

This invention relates to change speed transmissions, and an object of the invention is to provide such a transmission which may be used on lathes, automobiles, or wherever driving and driven shaftings are employed.

An object of the invention is the provision of a speed changing device in which, by a system of gears and clutches, the uniform speed of the driving shaft is transformed into a variable speed for the driven shaft and further to produce such a mechanism whereby speed changing without gear shifting may be accomplished.

The invention together with its objects will be best understood from a study of the following description taken in connection with the accompanying drawings wherein:

Figure 1 is a detail view partly in section and partly in elevation illustrating an application of the invention.

Figure 2 is a detail view taken substantially on the line 2—2 of Figure 1.

Figure 3 is an end elevational view of a series of concentric rings.

Figure 4 is an elevational view of the rings showing the end thereof opposite to that shown in Figure 3.

Figure 5 is a vertical transverse sectional view taken substantially on the line 5—5 of Figure 1.

Figure 6 is a plan view of a shifting sleeve.

Figure 7 is an elevational view of one of the aforementioned rings.

Figure 8 is a detail plan view showing the cam means for effecting a shifting of the ring members.

Figure 9 is an edge elevational view of a clutch member.

Figure 10:
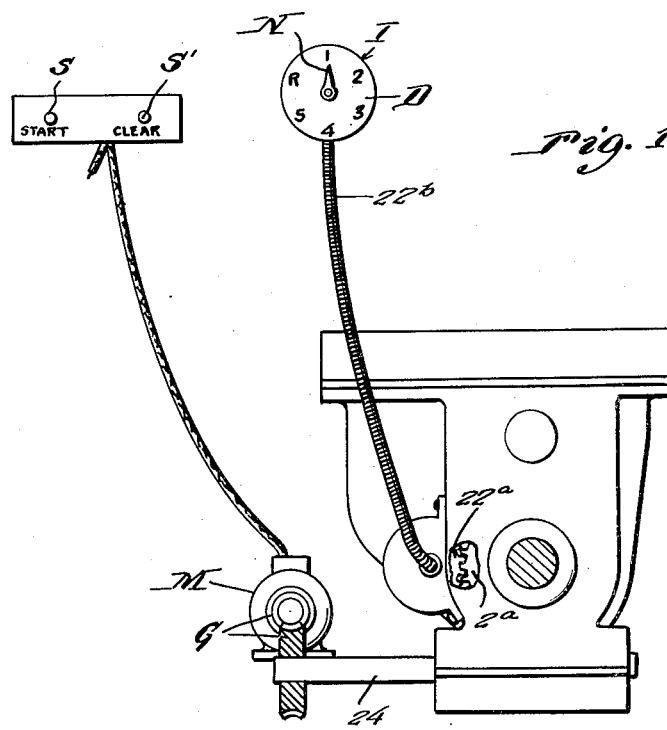
Figure 10 is a view illustrating, somewhat diagrammatically, an indicator and motor control.
Figure 11:
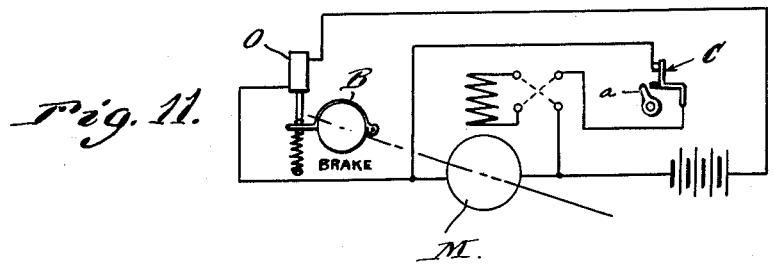
Figure 11 is a wiring diagram.
Figure 12:
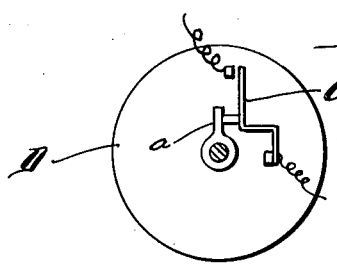
Figure 12 is a rear elevation of the indicator.

Referring to the drawings by reference numerals it will be seen that the numeral 1 designates the driving shaft, which may be the shaft that leads to a conventional form of internal combustion engine, and which in the present instance is provided with a high speed gear 2 that rotates with the shaft 1 and is in constant mesh with the gear 3 on the counter shaft 4. The counter shaft 4 is rotatably mounted in bearings 5 of a transmission casing 6.

Disposed in axial alignment with the driving shaft 1 is the driven shaft 7 which in the present instance may be the propeller shaft of an automobile. This shaft 7 has one end journalled in the gear equipped end of the shaft 1 and at said end the shaft 7 has disposed concentrically thereof an annular clutch member 33 which cooperates with a clutch face 34 provided on the adjacent end of the shaft 1 in a manner clearly shown in Figure 1 to provide a drive connection between the shafts 1 and 7, when the clutch 33 is placed in driving engagement with the shaft 7 as will be hereinafter made more manifest.

The shaft 7, within the case 6 is provided with a series of ribs 8 that project radially therefrom and as best shown in Figure 1 these ribs 8 are stepped to accommodate a plurality of speed gears 9.

Each gear 9 is provided with an internal central rib 10, and also, internally, presents tapered clutch surfaces 11 and 12 on opposite sides of the rib 10. Cooperable with the clutch faces 12 of the gears 9 are fixed clutch members 13 that are threadedly engaged with the steps of the ribs 8 as shown in Figure 1. In this connection it will be also noted that I provide a reversing gear 9' similar to the gears 9 and that the clutch member 33 is of substantially the same construction internally as the gears 9, and that cooperable with the clutch face of the member 33 corresponding to the clutch face of a gear 9 is a tapered clutch element 13' that is secured to a the shaft 7 in any suitable manner.

Cooperable with the clutch surfaces 11 of the gears 9 are clutch members 14 that are similar to the clutch member 13 but which are slidably supported by the ribs 8 to move into and out of frictional engagement with the faces 11 of the gears 9 so as to control the placing of said gears 9 into and out of driving engagement with the shaft 7. For the clutch member 13 there is also provided a slidable clutch element 14' corresponding to the aforementioned clutch element 14.

For shifting the clutch elements 14 and 14' there is provided a concentric series of tubular members 15 that are graduated in length, progressively decreasing in length from the inner to the outer one of said members 15. In this connection it will be noted that the outer member 15 is formed integral with the clutch element 14" provided for engagement with the face 11 of the reverse gear 9', while each of the remaining members 15 is provided with notches 15a receiving lugs 14a on its associated clutch element 14.

These tubular members 15 are provided as clearly shown in Figure 6 with longitudinal slots 16 that accommodate the ribs 8 provided on the shaft 7.

For successively shifting the members 15 there is provided a series of concentric rings 17 disposed concentrically of the shaft 7. These rings are provided at one end with balls 18', and at said end engage the adjacent ends of the tubular members 15. At the ends thereof, opposite to the balls 18' the rings 17 are provided, each, with a pair of diametrically opposed cam humps 30 with which is cooperable a diametrically extending rib 29 provided on one face of a disk 26 carried by a gear 22 mounted in one end of the casing 6.

The gear 22 is provided with a recess 25 outwardly from which is normally projected the disk 26 guided by suitable pins 27 and urged outwardly with respect to the recess through the medium of suitably arranged springs 28.

For driving the gear 22 in a manner to provide for the automatic shifting of the slidable clutch members into and out of engagement with the respective ring gears, there is provided a worm 23 on a shaft 24 driven from any suitable prime mover, preferably, a reversible electric motor M.

The aforementioned rings 17 are limited in their axial movement relative to one another through the medium of fixed pins 18 that extend inwardly toward the shaft 7 from a fixed annular frame 19 mounted within the casing 6 in any suitable manner and as suggested in Figure 1. These pins extend through aligned slots 20 provided in the members 17 as shown in Figures 1 and 7.

As will be understood a suitable control switch and indicator means will be provided whereby the operator may cut out the afore-mentioned motor for driving shaft 24 when the desired speed is obtained.

In this connection it will be understood, and as shown, the gears 9 are in constant mesh with speed gears 31 secured to the counter shaft 4 for rotation therewith, while of course the reverse gear 9' will be in mesh with an idler pinion that is in constant mesh with a pinion gear 31a provided on the counter shaft 4.

It will thus be seen that provision is made for both forward and reverse speed, and that a transition from one speed to another is automatic, is gradual and takes place as the speed, in the case of an automobile, is increased or reduced. It also will be apparent that with such a transmission the speed will be consecutively stepped from low to high speed and vice versa, and that the speed changing is effected without the shifting of any gears.

As is thought to be apparent, with any gear 9 placed in driving engagement with the shaft 7 the transmission of power from the shaft 1 is through the gear 2, the gear 3 and the gear 31 that is in mesh with the gear 9 placed in driving engagement with the shaft 7. When the innermost member 15 is shifted so as to engage the clutch member 14' with the clutch member 33 a direct drive between the shafts 1 and 7 is effected as thought apparent.

The operation of the transmission may be briefly described as follows:

When for example, it is desired to place the shafts 1 and 7 in direct driving engagement with one another the operator closes the switch S which may be suitably mounted at a convenient point near or remote from the motor M. The closing of the switch S will complete the circuit through the motor M and an electro-magnetic brake operating device O for releasing the motor brake B thereupon setting the motor M in operation. Drive from the motor M is transmitted through suitable gearing G to shaft 24. As before stated, power from shaft 24 is transmitted to the gear 22 for rotating the disk 26. When the alined ribs 29 on the disk 26 come into engagement with the alined projections 30 on the innermost ring 17 the latter will be caused to move toward the right in Figure 1. This innermost ring will thus be moved axially to engage and transmit corresponding movement to the innermost tubular member 15. The innermost tubular member 15, in turn, is thereby caused to engage clutch element 14', by urging the same toward the right in Figure 1, with the clutch 33. Clutch 33 is shifted in a corresponding direction to effect a frictional engagement thereof with the fixed clutch element 13'. Thus it will be seen that in this manner clutch element 33 is placed in driving engagement with shaft 7. Clutch 33 being thus placed in driving engagement with shaft 7, and being constantly engaged with shaft 1, through the clutch means 34 said clutch 33 will serve to transmit drive from shaft 1 to the shaft 7 whereby a direct driving engagement between shafts 1 and 7 is effected.

For use with the invention there is provided any suitable indicator, the same being denoted by the reference numeral I. The specific structural details of the indicator I is immaterial and is not of the essence of the invention, and therefore of this indicator there is shown but a dial D having on one face thereof the numerals 1, 3, 4, and 5 to indicate respectively first, second, third and fourth speeds respectively, said dial also being provided with the numeral 5 to indicate high speed, accomplished when shafts 1 and 3 are in direct driving engagement, and the letter R to indicate reverse speed. Further, of the indicator I there is also shown an index N adapted to be read against the numerals and the letter on the dial D and this index is driven from gear 22 through the medium of a gear 22a and flexible shafting 22b.

It will thus be apparent that when, for example, the alined ribs 29 on the disk 26 come into engagement with the alined projections 30 on the innermost ring 17 incidental to effecting a direct driving engagement between shafts 1 and 7 index N will have moved opposite to the numeral 5 on the dial D. Thus by reading the indicator the operator will know when this engagement of ribs 29 with the projections 30 on the innermost ring 17 has been effected. As soon as this result is so indicated by the indicator I the operator will then manipulate switch S to open the circuit through the motor and through the electro-magnetic brake operating device O whereupon the motor M will be caused to stop immediately, with the result that the said disk 26 will come to rest before its ribs 29 will come into engagement with the projections 30 on any of the other of the rings 17.

A change in speed is effected in substantially the same manner, it being apparent that when a desired speed is obtained the operator as before mentioned closes the circuit through the motor M for driving shaft 24 to thereby set the disk 26 in motion. When the ribs 29 on the disk comes into engagement with the projections on the proper ring 17, the operator will be so apprised by properly reading the indicator I, at which time he will then interrupt the circuit to the motor by opening the switch S. As previously explained, when the ribs 29 are thus brought into engagement with the projection 30 on the proper ring 17 the latter will be axially shifted for shifting the proper tubular member 15 to thereby engage the proper clutch element 14 with its associated speed gear 9.

A reverse speed is also obtained in substantially the same manner as is thought to be apparent from the above. To clear the transmission the operator closes the switch S' which may be suitably located adjacent to the aforementioned switch S. Closing of the switch S' will complete the circuit through the reversing field of the motor M as well as through the electro-magnetic brake operating device O. Motor M will thus be driven in a reverse direction, and drive from the motor M is transmitted to the index N through gearing G, shaft 24, gearing 22, 22a and shaft 22b. As the index N moves in the anti-clockwise direction an arm a on the shaft of the index N moves therewith and into engagement with the spring contact of a switch C for moving said spring contact of the switch out of engagement with the fixed contact of said switch thereby breaking the circuit through the motor M when the index N has returned to its normal or what may be termed zero indicating position.

Having thus described the invention, what is claimed as new is:

1. A change speed transmission comprising aligned driving and driven shafts, a counter shaft, gears on the counter shaft, a gear on the driving shaft in constant mesh with one of the gears on the counter shaft, a plurality of ring gears disposed about the driven shaft and in mesh with the gears on the counter shaft, and clutch means for each of the ring gears, for placing the ring gears in driving engagement with the driven shaft, said clutch means including a clutch member fixed on the driven shaft at one side of a ring gear, and a sliding clutch member at the side of a ring gear opposite to the aforementioned fixed clutch member, a plurality of concentric shiftable members, there being one shiftable member for each slidable clutch member and engageable therewith for moving the latter into engagement with its associated ring gear to place the same in driving engagement with the driven shaft, and actuating means for said shiftable members.

2. A change speed transmission comprising aligned driving and driven shafts, a counter shaft, gears on the counter shaft, a gear on the driving shaft in constant mesh with one of the gears on the counter shaft, a plurality of ring gears disposed about the driven shaft and in mesh with the gears on the counter shaft, and clutch means for each of the ring gears for placing the ring gears in driving engagement with the driven shaft, said clutch means including a clutch member fixed on the driven shaft at one side of a ring gear, and a sliding clutch member at the side of a ring gear opposite to the fixed clutch member, a plurality of concentric shiftable members, there being one shiftable member for each slidable clutch member and engageable therewith for moving the latter into engagement with its associated ring gear to place the same in driving engagement with the driven shaft, and actuating means for said shiftable members, said actuating means including a series of concentric ring members aligning with and adapted to engage the ends of said shiftable members for actuating the latter, and means for successively shifting the rings.

3. A change speed transmission comprising aligned driving and driven shafts, a counter shaft, gears on the counter shaft, a gear on the driving shaft in constant mesh with one of the gears on the counter shaft, a plurality of ring gears disposed about the driven shaft and in mesh with the gears on the counter shaft, and clutch means for each of the ring gears for placing the ring gears in driving engagement with the driven shaft, said clutch means including a clutch member fixed on the driven shaft at one side of a ring gear, and a sliding clutch member at the side of a ring gear opposite to the fixed clutch member, a plurality of concentric shiftable members, there being one shiftable member for each slidable clutch member and engageable therewith for moving the latter into engagement with its associated ring gear to place the same in driving engagement with the driven shaft, and actuating means for said shiftable members, said actuating means including a series of concentric ring members aligning with and adapted to engage the ends of said shiftable members for actuating the latter, and means for successively shifting the rings, including a driven member, cam means on the driven member and the rings cooperating to shift the latter successively relative to one another incidental to a rotation of said driven member.

4. A change speed transmission comprising aligned driving and driven shafts, a counter shaft, gears on the counter shaft, a gear on the driving shaft in constant mesh with one of the gears on the counter shaft, a plurality of ring gears disposed about the driven shaft and in mesh with the gears on the counter shaft, and clutch means for each of the ring gears for placing the ring gears in driving engagement with the driven shaft, said clutch means including a clutch member fixed on the driven shaft at one side of a ring gear, and a sliding clutch member at the side of a ring gear opposite to the fixed clutch member, a plurality of concentric shiftable members, there being one shiftable member for each slidable clutch member and engageable therewith for moving the latter into engagement with its associated ring gear to place the same in driving engagement with the driven shaft, and actuating means for said shiftable members, said actuating means including a series of concentric ring members aligning with and adapted to engage the ends of said shiftable members for actuating the latter, and means for successively shifting the rings, including a driven member, cam means on the driven member and the rings cooperating to shift the latter successively relative to one another incidental to a rotation of said driven member, and means for rotating said driven member including a gear on which said driven member is mounted, and a driven worm in mesh with said gear.

5. In a change speed transmission, aligned driving and driven shafts, a counter shaft, gearing connecting the driving shaft with the counter shaft, and speed gearings connecting the driven shaft with the counter shaft, said last named gearings including a plurality of ring gears disposed concentric to the driven shaft, said driven shaft being provided with a series of longitudinally extending ribs projecting radially therefrom, said ribs being stepped, and said ring gears being provided internally with oppositely tapered clutch surfaces, clutch members fixed to the steps of said ribs for engaging the ring gears internally, clutch members slidably supported by said ribs for engagement internally with the ring gears and to cooperate with the fixed clutch members for placing said ring gears in driving engagement with the driven shaft, and actuating means for the shiftable clutch members for successively shifting the shiftable clutch members for locking the ring gears to the driven shaft in successive order.

6. In a change speed transmission aligned driving and driven shafts, a counter shaft, gearing connecting the driven shaft with the counter shaft, and speed gearings connecting the driven shaft with the counter shaft, said last named gearings including a plurality of ring gears disposed concentric to the driven shaft, said driven shaft being provided with a series of longitudinally extending ribs projecting radially therefrom, said ribs being stepped, and said ring gears being provided internally with oppositely tapered clutch surfaces, clutch members fixed to the steps of said ribs for engaging the ring gears internally, clutch members slidably supported by said ribs for engagement internally with the ring gears and to cooperate with the fixed clutch members for placing said ring gears in driving engagement with the driven shaft, and actuating means for the shiftable clutch member for successively shifting the shiftable clutch members for locking the ring gears to the driven shaft in successive order, said means including a series of concentric tubular members graduating in length and slotted to accommodate said ribs, there being one tubular member for each shiftable clutch member and engaged with its clutch member to shift it, and means for shifting each tubular member.

7. In a change speed transmission, aligned driving and driven shafts, a counter shaft, gearing connecting the driven shaft with the counter shaft, and speed gearings connecting the driven shaft with the counter shaft, said last named gearings including a plurality of ring gears disposed concentric to the driven shaft, said driven shaft being provided with a series of longitudinally extending ribs projecting radially therefrom, said ribs being stepped, and said ring gears being provided internally with oppositely tapered clutch surfaces, clutch members fixed to the steps of said ribs for engaging the ring gears internally, clutch members slidably supported by said ribs for engagement internally with the ring gears and to cooperate with the fixed clutch members for placing said ring gears in driving engagement with the driven shaft, and actuating means for the shiftable clutch member for successively shifting the shiftable clutch members for locking the ring gears to the driven shaft in successive order, said means including a series of concentric tubular members graduating in length and slotted to accommodate said ribs, there being one tubular member for each shiftable clutch member and engaged with its clutch member to shift it, and means to shift each tubular member including a series of concentric rings alined with the tubular members, interengaging means on one end of said tubular members and said rings for transmitting axial shifting movement of each of said rings to the tubular member aligned therewith, and means for axially shifting each of said rings.

ROBERT E. LEWIS.